ent Number: 5,910,375

United States Patent [19]
Parker et al.

[11] Patent Number: 5,910,375
[45] Date of Patent: *Jun. 8, 1999

[54] TINTABLE, SCRATCH RESISTANT COATINGS FOR PLASTIC OPHTHALMIC LENSES

[75] Inventors: Theodore L. Parker, Danville; Anthony Lam; Nam Thanh Le, both of San Jose, all of Calif.

[73] Assignee: 2C Optics, Inc., Alpharetta, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/642,326

[22] Filed: May 3, 1996

[51] Int. Cl.$^6$ .............................. B32B 27/30; G02B 5/22; G03B 21/46

[52] U.S. Cl. ...................... 428/520; 351/163; 351/164; 351/165; 359/885; 428/522

[58] Field of Search ..................................... 351/163, 164, 351/165; 359/885; 428/412, 520, 522

[56] References Cited

U.S. PATENT DOCUMENTS

| | | | |
|---|---|---|---|
| 4,261,656 | 4/1981 | Wu | 351/163 |
| 4,320,940 | 3/1982 | Mueller et al. | 351/44 |
| 4,547,397 | 10/1985 | Burzynski et al. | 427/164 |
| 5,114,783 | 5/1992 | Hodnett, III | 428/217 |

FOREIGN PATENT DOCUMENTS

| | | | |
|---|---|---|---|
| 0 383 074 A2 | 8/1990 | European Pat. Off. | C09D 4/02 |
| WO 90/14946 | 12/1990 | WIPO . | |
| WO 95/17437 | 6/1995 | WIPO | C08F 2/46 |

*Primary Examiner*—D. S. Nakarani
*Attorney, Agent, or Firm*—Needle & Rosenberg, P.C.

[57] ABSTRACT

A dual coating is provided for tinting a plastic material such that the plastic material is tinted and rendered scratch resistant. Also provided is tintable, scratch resistant plastic materials and tinted, scratch resistant plastic materials. The dual layer coating includes a dye reservoir layer formed over a surface of the material to be tinted and a hard coating layer formed over the dye reservoir layer. The dye reservoir layer includes between about fifteen and eighty percent by weight of a flexible acrylated oligomer or acrylated oligomer/acrylate monomer blend resin, and between about one and seventy percent by weight of a mono vinyl functional reactive diluent. The hard coating layer formed over the dye reservoir layer includes between about twenty and one hundred percent by weight of alkane polyols, the alkane polyols containing up to about forty eight carbon atoms and at least three O-[acryloyl(polyalkylene oxide)] groups, each polyalkylene oxide chain including between about one and twenty alkylene oxide groups, and between about ten and seventy percent by weight of polyacryloylated alkane polyols, the alkane polyols containing up to about twenty four carbon atoms and at least about two O-acryloyl groups.

55 Claims, 4 Drawing Sheets

⇩ SPIN

⇩ CURE

⇩ APPLY SECOND PRECURSOR LAYER

⇩ SOLIDIFY

⇩ INTRODUCE DYE

TINTABLE, SCRATCH RESISTANT COATINGS FOR PLASTIC OPHTHALMIC LENSES

BACKGROUND OF THE INVENTION

Clear plastic ophthalmic lenses which provide good imaging qualities while reducing the transmission of incident light into the eye are needed for a variety of applications including use in sunglasses, fashion lens, prescription sport masks, face shields, and goggles. For these and other applications, ophthalmic lenses preferably are also scratch resistant.

Tinting is a common method for reducing the transmission of incident light through clear plastic materials, such as is used to form plastic ophthalmic lenses. Tinting refers to a process for treating a clear material to reduce the through transmission of light at particular wavelengths. The optical qualities introduced to a material by the tinting process are commonly characterized by the wavelengths of light transmitted and absorbed by the tinted material. The intensity of tinting, also commonly referred to as transmission loss, refers to the degree to which the tinted material reduces the intensity of light which passes through the tinted material. As much as a 60–90% reduction in light transmission can be achieved through tinting.

One common method for tinting involves dipping the material to be tinted into an aqueous solution of a dye at an elevated temperature, generally between about 85–95° C. At these elevated temperatures, tinting is generally accomplished in about 3–60 minutes. Elevated temperatures are used to accelerate the absorption of the dye into the material being tinted. The tinting conditions used for a particular material depends on the physical qualities of the material to be tinted. For example, the maximum temperature at which tinting can be performed is limited by the temperature stability of the plastic material and dyes.

Two types of plastics which are commonly used to form ophthalmic lenses are poly(diethyleneglycol) bis allyl carbonate, tradenamed CR-39, and a bisphenol A based polycarbonate, commonly called PC. These plastics are generally tinted by dipping the plastics in an aqueous solution of a dye. Another type of plastic used to form ophthalmic lenses is polymethylmethacrylate, tradenamed PMMA. PMMA has a glass transition temperature which is too low for it to withstand the temperatures used in the dipping method of tinting. Instead, tinting of PMMA plastic is performed by other methods.

CR-39 plastic can be readily tinted since it is able to absorb dyes from an aqueous solution and is stable at elevated bath temperatures. One disadvantage associated with using tinted CR-39 is that it has inferior scratch resistance when dispensed uncoated. Although coatings are available which enhance the scratch resistance of plastic surfaces, these scratch resistant coatings are not generally applied to CR-39 because the coatings tend to reduce the tintability of the underlying substrate by blocking the ingress of dye.

Although PC plastic is stable at elevated tint bath temperatures, PC plastic does not readily absorb dyes from an aqueous bath. As a result, PC plastic is not usually tinted by introducing a dye into the plastic. Instead, PC plastic is more commonly tinted by coating the plastic with a material which can absorb dyes from an aqueous bath. Current coating products for PC plastic include a material which is applied to the PC plastic as a thin liquid coating and then cured to form a single film layer over the PC plastic surface.

The surface of uncoated PC plastic is too soft and too readily scratched to be dispensed without the use of a scratch resistant coating. Hence, in addition to a film layer for tinting PC plastic, a film layer is also needed which enhances the scratch resistance of PC plastic. This scratch resistant layer may be the same layer used to tint the PC plastic or may be separate from the layer used to tint the PC plastic.

It is generally difficult to render a material both highly tinted and highly scratch resistant. As the tintability of a coating increases, the scratch resistance of the coating usually decreases and vice versa. This is probably because coatings which have a relatively low cross-link density and a loose network structure facilitate the infusion and transport of dye into a material to tint the material. By contrast, coatings which have a relatively high cross-link density and a tight network structure generally exhibit greater scratch resistance.

A need exists for a coating or combination of coatings which render a material both highly tinted and highly scratch resistant. A need also exists for a method for rendering the material both highly tinted and highly scratch resistant. A need also exists for a method for forming ophthalmic lenses which are both highly tinted and highly scratch resistant. These and other objects are achieved by the present invention which is described herein.

The present invention relates to coatings and methods for tinting a plastic material such that the plastic material is rendered both highly tinted and highly scratch resistant. One embodiment of the invention relates to a dual layer coating for tinting a material and rendering the surface of the tinted material highly scratch resistant. In this embodiment, the dual coating includes a dye reservoir layer formed over a surface of the material to be tinted and a hard coating layer formed over the dye reservoir layer.

The dye reservoir layer includes between about fifteen and eighty percent by weight of a flexible acrylated oligomer or acrylated oligomer/acrylate monomer blend resin, and one to seventy percent by weight of a mono vinyl functional reactive diluent.

The hard coating layer formed over the dye reservoir layer includes between about twenty and one hundred percent by weight of acryloylated alkane polyols, the alkane polyols containing up to about forty eight carbon atoms and at least three O-[acryloyl(polyalkylene oxide)] groups, each polyalkylene oxide chain including between about one and twenty alkylene oxide groups, and between about ten and seventy percent by weight of polyacryloylated alkane polyols, the alkane polyols containing up to about twenty four carbon atoms and at least about two O-acryloyl groups.

The dye reservoir layer may also include:

between about five and sixty percent by weight of polyacryloylated alkane polyols, the alkane polyols containing up to about twenty four carbon atoms and at least about two O-acryloyl groups; and/or between about fifteen and seventy five percent by weight of a polyacrylated urethane, the urethane having a molecular weight of less about 3500 and at least about two acrylate groups; and/or between about one tenth and fifteen percent by weight of a non-vinyl functional plasticizer; and/or one or more from the group consisting of surfactants, anti-oxidants, anti-yellowing agents and stabilizers.

In one embodiment, the dye reservoir layer includes between about thirty five and sixty percent by weight of a flexible acrylated oligomer or acrylated oligomer/acrylate monomer blend resin, between about thirty and sixty percent by weight of a mono vinyl functional reactive diluent which includes O-acryloyl, and between about ten and thirty percent by weight of polyacryloylated alkane polyols, the alkane polyols containing up to about twenty four carbon atoms and at least about two O-acryloyl groups.

The hard coating layer may also include:

one or more from the group consisting of surfactants, anti-oxidants, anti-yellowing agents and stabilizers; and/or up to about fifteen percent by weight of an adhesion promoting acrylated oligomer or acrylated oligomer/acrylate monomer blend resin; and/or up to about sixty percent by weight of a mono vinyl functional reactive diluent.

In one embodiment, the hard coating layer includes:

between about thirty and sixty five percent by weight of alkane polyols, the alkane polyols containing up to about forty eight carbon atoms and at least about three O-[acryloyl(polyalkylene oxide)] groups and wherein the polyalkylene oxide chains include between about one and twenty alkylene oxide groups;

between about thirty five and sixty percent by weight of polyacryloylated alkane polyols, the alkane polyols containing up to about twenty four carbon atoms and at least about two O-acryloyl groups; and between about two to ten percent by weight of an adhesion promoting acrylated oligomer or acrylated oligomer/acrylate monomer blend resin.

In one embodiment, the adhesion promoting resin is selected from the group consisting of acrylated urethane, acrylated epoxy and acrylated ester oligomer resins.

The present invention also relates to a tintable scratch resistant plastic. In one embodiment, the tintable scratch resistant plastic includes a clear plastic having a first surface, a dye reservoir layer formed over the first surface, and a hard coating layer formed over the dye reservoir layer. In another embodiment, the tintable, scratch resistant plastic includes a clear plastic having first and second surfaces. A dye reservoir layer is formed over the first surface, and a hard coating layer formed over the dye reservoir layer and over the second surface. In another embodiment, the tintable, scratch resistant plastic includes a clear plastic having first and second surfaces. A first and a second dye reservoir layer is formed over the first and second surfaces respectively. A first and second hard coating layer is formed over the first and second dye reservoir layers respectively.

The present invention also relates to a tinted scratch resistant plastic which includes a tintable scratch resistant plastic as described above in which the dye reservior layer further includes a dye.

BRIEF DESCRIPTION OF THE FIGURES

FIG. 4A illustrates forming a dye reservoir layer over one side of a clear plastic material.

FIG. 4B illustrates forming a hard coating layer over the dye reservoir layer.

FIG. 4C illustrates introducing a dye into the dye reservoir layer through the hard coating layer.

FIG. 5A illustrates forming a dye reservoir layer over opposing sides of a clear plastic material.

FIG. 5B illustrates forming hard coating layers over the dye reservoir layers.

FIG. 5C illustrates introducing a dye into the dye reservoir layers through the hard coating layers.

FIG. 6A illustrates forming a dye reservoir layer over one side of a clear plastic material.

FIG. 6B illustrates forming hard coating layer over the dye reservoir layer and over the opposing side of the plastic material.

FIG. 6C illustrates introducing a dye into the dye reservoir layer through the hard coating layer.

DETAILED DESCRIPTION

A coating is provided in the present invention for tinting a plastic material such that the plastic material is rendered both highly tinted and highly scratch resistant. Also provided is a tintable and scratch resistant plastic as well as a tinted and scratch resistant plastic.

The tinted, scratch resistant plastic may be used in a variety of applications. One such application is the formation of ophthalmic lenses. These lenses may be used in a variety of applications, including, but not limited to sunglasses, fashion lens, prescription sport masks, face shields, and goggles.

Figure 1:
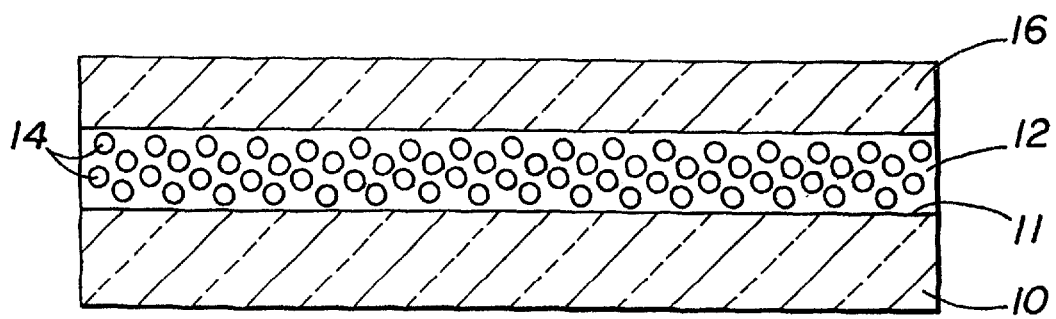
FIG. 1 illustrates a tinted, scratch resistant clear plastic according to the present invention which is coated on one side.

An embodiment of a tinted, scratch resistant clear plastic according to the present invention is illustrated in FIG. 1. As illustrated in FIG. 1, a surface 11 of the clear plastic material 10 is covered with a dye reservoir layer 12 which includes a dye 14 which tints the clear plastic material. Covering the dye reservoir layer 12 is a hard coating layer 16 which is more scratch resistant than the dye reservoir layer 12 or the underlying clear plastic material 10.

Figure 2:
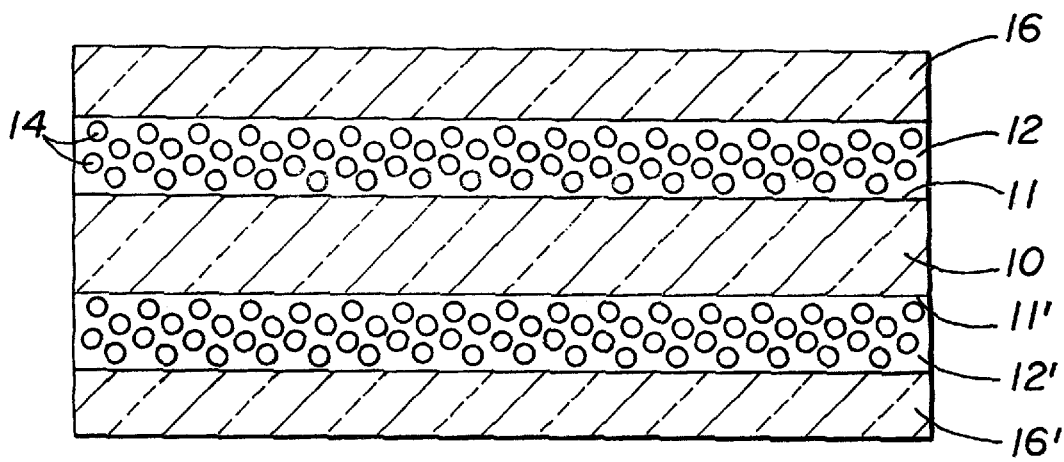
FIG. 2 illustrates a tinted, scratch resistant clear plastic according to the present invention which is coated on two opposing sides.

An alternate embodiment of a tinted, scratch resistant clear plastic according to the present invention is illustrated in FIG. 2. As illustrated in FIG. 2, the clear plastic material 10 has opposing surfaces 11, 11' which are covered by a dye reservoir layer 12, 12' and a hard coating layer 16, 16'.

Figure 3:
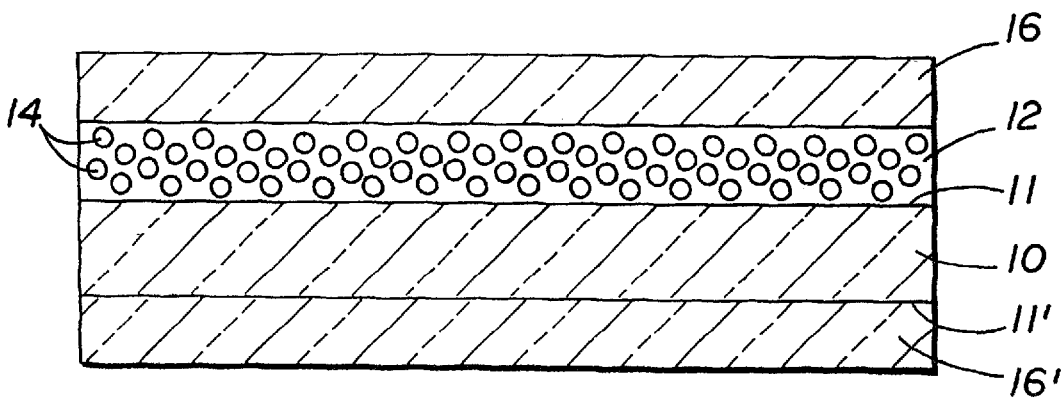
FIG. 3 illustrates a tinted, scratch resistant clear plastic according to the present invention which is tinted and rendered scratch resistant on one side and which rendered scratch resistant on the other side.

Yet another alternate embodiment of a tinted, scratch resistant clear plastic according to the present invention is illustrated in FIG. 3. In this embodiment, the clear plastic material 10 has opposing surfaces 11, 11'. Surface 11 is covered by a dye reservoir layer 12 and a hard coating layer 16. Meanwhile, surface 11' is covered by a hard coating layer 16'.

The degree of transmission loss and the particular wavelengths at which transmission loss occurs can be controlled by a variety of factors including the dye, the concentration of the dye in the dye reservoir layer, the thickness of the dye reservoir layer, the thickness of the hard coating layer and the transmissive properties of the hard coating layer. When a tint bath process is used to introduce the dye into the dye reservoir layer, the concentration of the dye in the dye reservoir layer can be controlled by the time and temperature at which the plastic material is subjected to the tint bath process, as well as the innate reservoir capacity per unit volume of the particular dye reservoir layer.

The dye reservoir layer and the hard coating layer can be formed by a variety of methods. In one embodiment, one or both layers are formed by a spin coating process. A typical spin coating method for coating opthomakic lenses is described in U.S. Pat. No. 5,246,728 which is incorporated herein by reference. According to the spin coating process, a precursor layer is applied to a surface of the material, for example by a drip or spray nozzle. The material is then spun to distribute the layer precursor over the surface. In another embodiment, the dye reservoir layer and/or the hard coating layer is formed by a dip coating process. According to the dip coating process, the material is dipped in a liquid containing the layer precursor. As a result, both sides of the material are coated with the layer precursor in the dip coating process.

The thicknesses of the dye reservoir layer and the hard coating layer can each be quantitatively controlled by controlling a variety of variables. For example, if the layers are formed by a spin coating process, the final thickness of the layer will be dependent on the viscosity of the layer precursors used to form each layer, the spin speed and the spin duration. In embodiments where the layer is formed by a spin coating process, spin duration is generally from a few seconds to a few minutes. In embodiments where the layer is formed by a dip coating process, the thickness of the layer formed can be controlled by the concentration of solids in the coating liquid, i.e., the amount of neat layer precursor which is dissolved in the carrier solvent, the viscosity of the layer precursor after removal of the carrier solvent, and the speed with which the coated part is removed from the dip bath. In one embodiment of the dip coating process, the layer precursor has a viscosity between about 5–200 cPs.

Figure 4A:
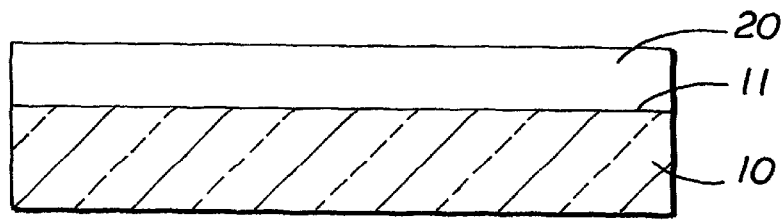
FIGS. 4A–C illustrate the process of forming the tinted plastic material illustrated in FIG. 1.
Figure 4B:
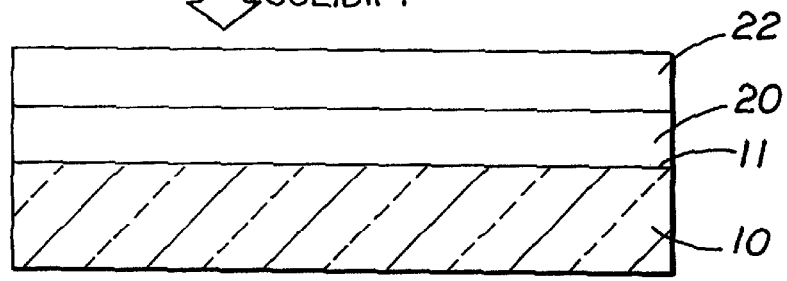
Figure 4C:
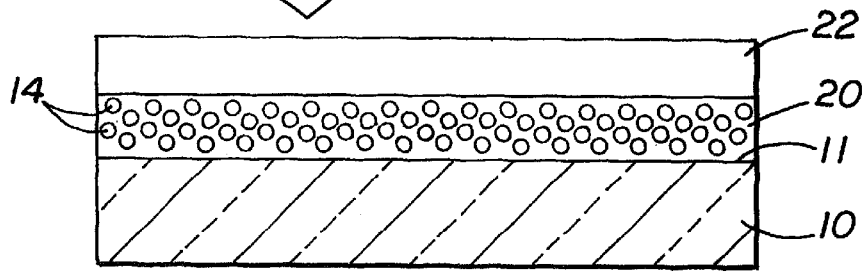

One process for forming the tinted plastic material illustrated in FIG. 1 is illustrated in FIGS. 4A–C. As illustrated in FIG. 4A, a dye reservoir layer 12 is formed over a clear plastic material 10 by covering the plastic material 10 with a thin layer of a dye reservoir precursor 20 which when cured can readily absorb a tinting dye. The thickness of the dye reservoir precursor layer 20 can be controlled, for example, by controlling the speed and time of the spin coating process, as well as by the viscosity of the liquid.

Once the thin layer of the dye reservoir layer precursor 20 is distributed over the plastic material surface 11, the layer precursor is cured by exposure to an energy source. A variety of energy sources may be used to cure the layer. In one embodiment, the energy source is UV actinic radiation.

As illustrated in FIG. 4B, a hard coating layer 16 is formed over the cured dye reservoir layer 20 by covering the dye reservoir layer 20 with a thin layer of a hard coating precursor 22 which when cured forms the hard coating layer 14 which is more scratch resistant than the dye reservoir layer 12 or the underlying clear plastic 10. One method for introducing the hard coating precursor layer 22 is in conjunction with a spin coating process in which the precursor is added by a spray or drizzle nozzle in a spin coating line. The thickness of the hard coating precursor layer 22 can be controlled, for example, by controlling the speed and time of the spin coating process, as well as by the viscosity of the liquid.

Once the hard coating precursor layer 22 has been distributed over the plastic material surface 11, the hard coating precursor layer 22 is cured by exposure to an energy source. A variety of energy sources may be used to cure the layer. In one embodiment, the energy source is UV actinic radiation.

As illustrated in FIG. 4C, a dye 14 is introduced into the cured dye reservoir layer 20 through the cured hard coating layer 22. This may be accomplished, for example, by dipping the dual coated material into an aqueous based dye bath until a desired amount of dye has been introduced into the cured dye reservoir layer 20.

Figure 5A:
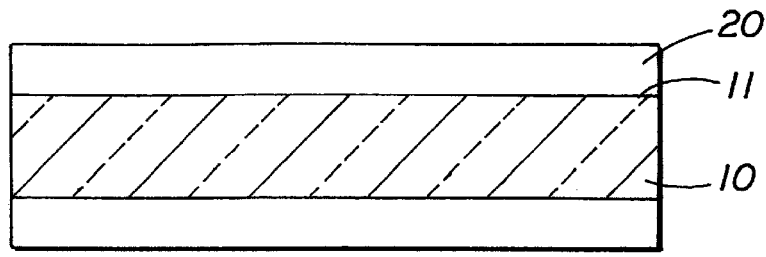
FIGS. 5A–C illustrate the process of forming the tinted plastic material illustrated in FIG. 2.
Figure 5B:
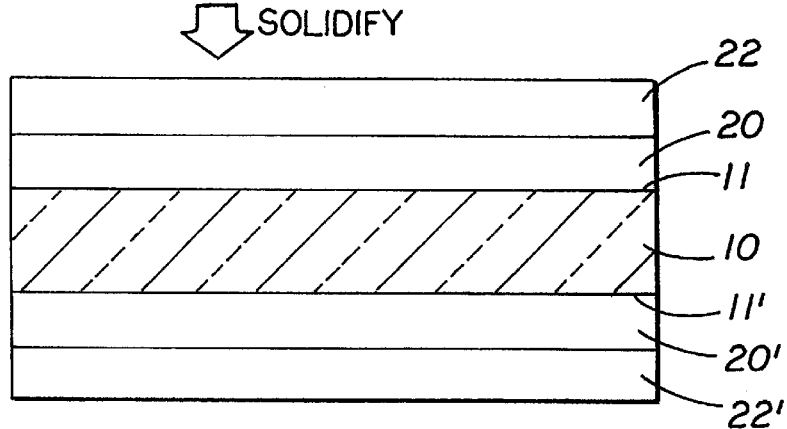
Figure 5C:
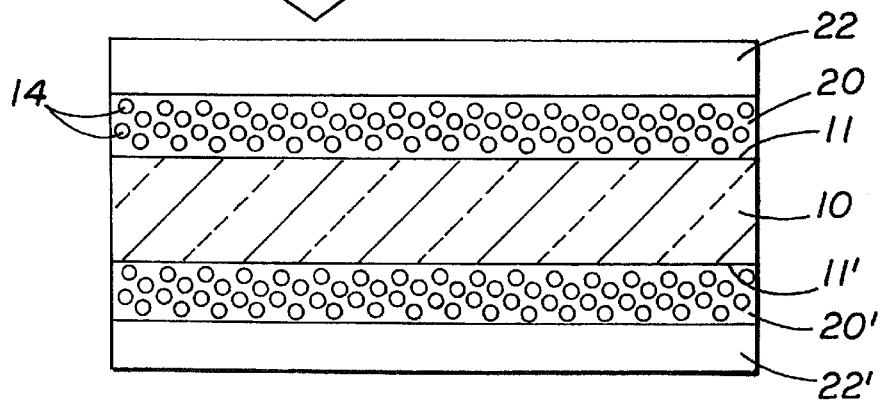

One process for forming the tinted plastic material illustrated in FIG. 2 is illustrated in FIGS. 5A–C. As illustrated in FIG. 5A, layers 20, 20' of the precursor for the dye reservoir layer are formed on opposing surfaces 11, 11' of the clear plastic material 10. One method for forming the dye reservoir precursor layer on opposing surfaces 11, 11' of the clear plastic material 10 is by dipping the plastic material 10 in a liquid containing the dye reservoir precursor.

Once the thin layers of dye reservoir precursor are distributed over the plastic material surfaces 11, 11', the dye reservoir precursor layers are cured by exposure to an energy source, such as those described above with regard to FIG. 4.

As illustrated in FIG. 5B, a hard coating layer 16 is formed over the cured dye reservoir layers 20, 20' by covering the layers 20, 20' with a thin layer of a hard coating precursor 22, 22' which when cured forms a hard coating layer 14 which is more scratch resistant than the dye reservoir layer 12 or the underlying clear plastic 10. One method for forming the hard coating precursor layers 22, 22' is by dipping the plastic material 10 in a liquid containing the hard coating precursor.

Once the dye reservoir precursor layers 22, 22' have been distributed over the opposing surfaces 11, 11' of plastic material, the layers 22, 22' are cured by exposure to an energy source. A variety of energy sources may be used such as those described above with regard to FIG. 4.

As illustrated in FIG. 5C, a dye 14 is introduced into the cured dye reservoir layers 20, 20' through the cured hard coating layers 22, 22'. This may be accomplished, for example, by dipping the dual coated material into an aqueous based dye bath until the desired amount of dye has been introduced into the cured dye reservoir layers 20, 20'.

Figure 6A:
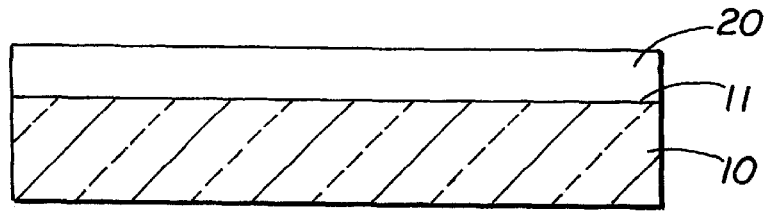
FIGS. 6A–C illustrate the process of forming the tinted plastic material illustrated in FIG. 3.
Figure 6B:
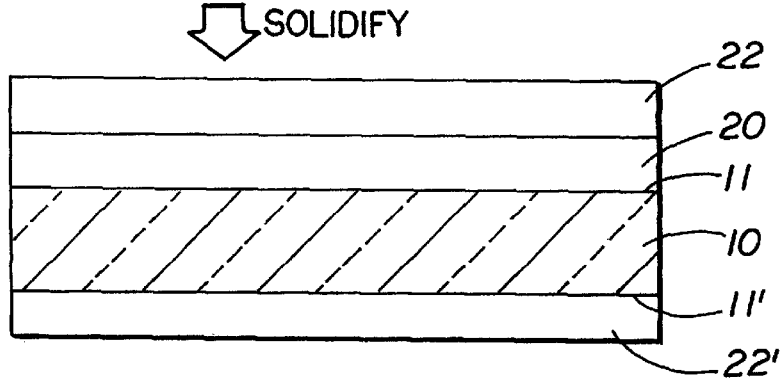
Figure 6C:
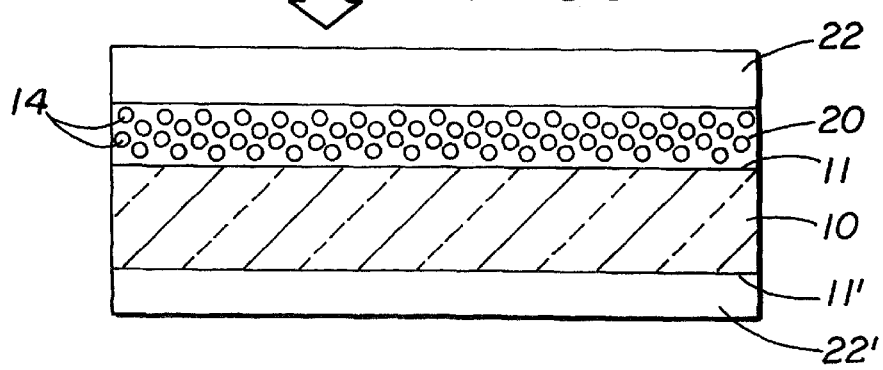

One process for forming the tinted plastic material illustrated in FIG. 3 is illustrated in FIGS. 6A–C. As illustrated in FIG. 6A, a layer 20 of a dye reservoir precursor is formed on a surface 11 of the clear plastic material 10 which when cured readily absorb a tinting dye. One method for forming the dye reservoir precursor layer is by spin coating the surface of the plastic material 10 with the dye reservoir precursor.

Once a thin layer 20 of the dye reservoir precursor is distributed over the plastic material surface 11, the dye reservoir precursor is cured by exposure to an energy source. A variety of energy sources may be used including A variety of energy sources may be used such as those described above with regard to FIG. 4.

As illustrated in FIG. 6B, a hard coating layer 16 is formed over the dye reservoir layer 20 and over the opposing surface 11' of the plastic 10 by covering the cured dye reservoir layer 20 and opposing surface 11' with a thin layer 22, 22' of a hard coating precursor which when cured forms the hard coating layer 16 which is more scratch resistant than the dye reservoir layer 12 or the underlying clear plastic 10. One method for forming the thin layers of the hard coating precursor 22, 22' is by dipping the plastic material 10 into a liquid containing the hard coating layer precursor.

Once the thin layers of the dye reservoir precursor 22, 22' are formed, the layers are cured by exposure to an energy source. A variety of energy sources may be used such as those described above with regard to FIG. 4.

As illustrated in FIG. 6C, a dye 14 is introduced into the cured dye reservoir layer 20 through the cured hard coating layer 22. This may be accomplished, for example, by dipping the coated plastic into an aqueous based dye bath until the desired amount of dye has been introduced into the cured dye reservoir precursor layer 20.

By the processes described above, a tinted clear plastic material is produced which has two specific layers, a dye reservoir layer 12 and hard coating layer 16. Each layer has specific functions. The dye reservoir layer 12 serves as a reservoir for a dye 16 used to tint the plastic material 10 and as an adhesive layer for attaching the hard coating layer 16 to the plastic material 10. Meanwhile, the hard coating layer 16 provides improved scratch and abrasion resistance while allowing dye 14 to be diffused through the hard coating layer to the dye reservoir layer 12.

In one embodiment, the dye reservoir layer is between about 1–50 microns thick, in another embodiment between about 3–25 microns thick and in another embodiment between about 5–15 microns thick.

In one embodiment, the hard coating layer is between about 2–50 microns thick, in another embodiment between about 3–25 microns thick and in another embodiment between about 5–15 microns thick.

In one embodiment of the process for forming the dye reservoir layer and the hard coating layer, the precursors used to form these layers are applied neat, i.e., without the use of a carrier solvent. This type of formulation is also referred to herein as a 100% solids formulation. Volatile solvents currently make up as much as 65% by weight of current commercially available coating composition. These solvents can be flammable, have an odor and/or present a health hazard due to their toxicity.

Neat formulations, such as those provided in the present invention, provide the advantage that no solvent vapors are released in the process of forming the dye reservoir layer and/or the hard coating layer. Neat formulations thus provide a significant advantage over formulations which include a carrier solvent by avoiding the need for a chemical fume hood with outside ventilation and scrubbers to remove the vapors that are necessarily given off.

The variety of different dye reservoir precursor formulations may be used to form the dye reservoir layer 12. In one embodiment, the dye reservoir precursor includes:

between about fifteen and eighty percent by weight to a flexible acrylated oligomer or acrylated oligomer/acrylate monomer blend resin (A); and between about one and seventy percent by weight of a mono vinyl functional reactive diluent (RD).

Optionally, the dye reservoir precursor includes between about five and thirty percent by weight of polyacryloylated alkane polyols (AE), wherein the alkane polyols contain up to about twenty four carbon atoms and an average of at least two O-acryloyl groups.

Optionally, the dye reservoir precursor further includes between about fifteen and seventy five percent by weight of a polyacrylated urethane (UA), wherein the urethane oligomer has a molecular weight of about 3500 or less and an average of at least two acrylate groups.

Optionally, the dye reservoir precursors may also include between about one tenth and fifteen percent by weight of a non-vinyl functional plasticizer (P), the plasticizer causing the cured dye reservoir layer to tint faster and be more dye absorbent than the cured scratch resistant, dye transmitting layer.

Optionally, the dye reservoir precursor also includes surfactants, antioxidants, anti-yellowing agents and stabilizers.

The dye reservoir precursor also contains a sufficient quantity of a photoinitiator, typically at least about one tenth to about ten percent by weight, to cause the precursor to self-react when exposed to an energy source. Optionally, the dye reservoir precursor also includes surfactants, antioxidants, anti-yellowing agents and stabilizers.

In one embodiment, the dye reservoir layer includes:

between about thirty five and sixty percent by weight of a flexible acrylated oligomer or acrylated oligomer/acrylate monomer blend resin (A);

between about thirty and sixty percent by weight of a mono vinyl, including an O-acryloyl functional reactive diluent (RD); and between about ten and thirty percent by weight of poly-acryloylated alkane polyols, wherein the alkane polyols contain up to about twenty four carbon atoms and an average of at least two O-acryloyl groups (AE).

Specific examples of dye reservoir precursor components which may be used to form the dye reservoir layer 12 are listed in Table 1. These precursors may be classified as flexible acrylated oligomer or oligomer/monomer blend resins, mono vinyl functional reactive diluents, functional acrylated and methacrylated aliphatic polyol esters, which may be represented by the general formula:

$$(Polyol)\text{-}(O\text{---}CO\text{---}CH\text{=}CH_2)_n$$

where $n \geq 2$, alkoxylated acrylate esters which may be represented by the general formula:

$$(Polyol)\text{-}(O\text{---}(C_n H_{2n}O)_m \text{---}CO\text{---}CH\text{=}CH_2)_p$$

where $p \geq 3$; m=1–20; and n is 2 or 3, urethane acrylates, and placticizers.

As used in this application, it is understood that acrylated refer to esters of both acrylic acid as well as esters of methacrylic acid, also known as methacrylate esters.

TABLE 1

FLEXIBLE ACRYLATED OLIGOMER
OR OLIGOMER/MONOMER BLEND RESIN

Sartomer CN 300, Radcure Ebecryl 3600, Ebecryl 3703, Ebecryl 270, Ebecryl 4830, Ebecryl 4834, Ebecryl 4881, Ebecryl 4883, Ebecryl 8402, Ebecryl 525, Ebecryl 585, Ebecryl 745, Ebecryl 754, Ebecryl 767, Ebecryl 1755, Henkel Photomer 6230, DSM Desotech 3471-1-135, Loctite 3211

MONO VINYL FUNCTIONAL REACTIVE DILUENTS

Sartomer SR 203, SR 232, SR 244, SR 256, SR 285, SR 339, SR 395, SR 440, SR 493, SR 495, SR 506; Radcure IBOA, Radcure ODA, Radcure β-CEA; Henkel Photomer 4039, Photomer 4812, Photomer 4816, Photomer 4822, Photomer 8061 and Photomer 8127; hydroxyethyl acrylate (HEA), hydroxpropyl acrylate (HPA), hydroxybutyl acrylate (HBA), hydroxyethyl methacrylate (HEMA), hydroxypropyl methacrylate (HPMA), and hydroxy-poly(alkyleneoxy)alkyl acrylates and methacrylates; aromatic acrylate and methacrylate esters, such as phenoxyethyl acrylate, poly-ethoxylated and poly-propoxylated phenoxyalkyloxy acrylates and methacrylates.

ALKOXYLATED ACRYLATE ESTERS

Sartomer SR 415, SR 454, SR 492, SR 499, SR 502, SR 9035; Radcure OTA-480, Radcure TMPTEOA, Radcure Ebecryl 53; Henkel Photomer 4072, Photomer 4094, Photomer 4095, Photomer 4149, Photomer 4155, Photomer 4158, and Photomer 4355.

FUNCTIONAL ACRYLATE ALIPHATIC POLYOL ESTERS

Two Functional Acrylated Aliphatic Polyol Esters: Sartomer SR 205, SR 209, SR 210, SR 230, SR 231, SR 252, SR 259, SR 268, SR 272, SR 306, SR 344, SR 9003, SR 9209; Radcure TRPGDA, Radcure HDODA; Henkel Photomer 4050, Photomer 4065, Photomer 4061, Photomer 4126, Photomer 4127, Photomer 4160, Photomer 4193, and Photomer 4204. Three or Greater Functional Acrylated Aliphatic Polyol Esters: Sartomer SR 350, SR 351, SR 444, SR 295, SR 355, SR 399, SR 9041; Radcure DPHPA, Radcure PETA K, Radcure TMPTA; Henkel Photomer 4006, Photomer 4355, and Photomer 4399.

URETHANE ACRYLATES

Sartomer CN 953, CN 961, CN 963, Sartomer CN 964, CN 966, CN 970, CN 971, CN 972, CN 975, CN 980; Radcure Ebecryl 270, Ebecryl 284, Ebecryl 285, Ebecryl 4830, Ebecryl 8301, Ebecryl 8402, Ebecryl 8804, Ebecryl 220, Ebecryl 6602; Henkel Photomer 6210, Photomer 6008, Photomer 6010.

PLASTICIZERS

Aliphatic or aralkyl esters of aromatic acids, diacids, and triacids, (such as benzoic, phthalic, isophthalic, terephthalic, and trimellitic acids) such as dioctyl phthalate (DOP) and dibenzyl phthalate; the aliphatic or aralkyl esters of ailphatic acids (such as adiptic, azelaic, glutaric, and citric acids) such as dioctyl adipate; and phosphate esters.

A variety of hard coating layer precursor compositions may be used to form the hard coating layer 16. In one embodiment, the hard coating layer precursor includes:

between about twenty and one hundred percent by weight of alkane polyols (AOA), wherein the alkane polyols contain up to about forty eight carbon atoms and average at least three O-[acryloyl(polyalkylene oxide)] groups, each of the polyalkylene oxide chains including between about one and twenty alkylene oxide groups; and between about ten and seventy percent by weight of polyacryloylated alkane polyols (AE), the alkane polyols containing up to about twenty four carbon atoms and an average of at least two O-acryloyl groups.

The hard coating precursor also contains a sufficient quantity of a photointiator, typically at least about one tenth to about ten percent by weight, to cause the precursor to self-react when exposed to an energy source. Optionally, the hard coating layer precursor may also include surfactants, antioxidants, anti-yellowing agents and/or stabilizers.

Optionally, the hard coating precursor also includes up to about fifteen percent by weight of an adhesion promoting acrylated oligomer or acrylated oligomer/acrylate monomer blend resin (ADH), such as acrylated urethane, acrylated epoxy and /or acrylated ester oligomer resins.

Optionally, the hard coating precursor also includes up to about sixty percent by weight of a mono vinyl functional reactive diluent (RD) which renders the hard coating later more scratch resistant than the underlying dye reservoir layer.

In one embodiment of the present invention, the hard coating layer precursor includes:

between about thirty and sixty five percent by weight of alkane polyols (AOA), the alkane polyols containing up to about forty eight carbon atoms and average at least three O-[acryloyl(polyalkylene oxide)] groups; each of the polyalkylene oxide chains including between about one and twenty alkylene oxide groups;

between about thirty five and sixty of polyacryloylated alkane polyols (AE), the alkane polyols containing up to about twenty four carbon atoms and an average of at least two O-acryloyl groups; and between about two and ten percent by weight of an adhesion promoting acrylated oligomer or acrylated oligomer/acrylate monomer blend resin (ADH), such as acrylated urethane, acrylated epoxy and/or acrylated ester oligomer resins.

More specific examples of hard coating precursors which may be used to form the hard coating layer 16 are listed in Table 2. With regard to the compounds specified in Table 2, it should be understood that acrylate esters refer to esters of acrylic acid as well as esters of methacrylic acid, the so-called methacrylate esters. These precursors may be classified as adhesion promoting oligomer or oligomer/monomer blend materials, mono vinyl functional reactive diluents, acrylate ester, which may be represented by the general formula:

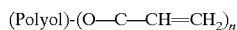
(Polyol)-(O—C—CH=CH$_2$)$_n$ where n≧2, and alkoxylated acrylate esters which may be represented by the general formula

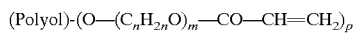
(Polyol)-(O—(C$_n$H$_{2n}$O)$_m$—CO—CH=CH$_2$)$_p$ where p≧3, m—1–20, and n is 2 or 3.

TABLE 2

ADHESION PROMOTING ACRYLATED OLIGOMER OR OLIGOMER/MONOMER BLEND RESIN MATERIAL

Sartomer CN 300, CN 953, CN 961, CN 963, Sartomer CN 964, CN 966, CN 970, CN 971, CN 972, CN 975, CN 980; Radcure Ebecryl 3600, Ebecryl 3703, Ebecryl 270, Ebecryl 4830, Ebecryl 4834, Ebecryl 4881, Ebecryl 4883, Ebecryl 8402, Ebecryl 525, Ebecryl 585, Ebecryl 745, Ebecryl 754, Ebecryl 767, Ebecryl 1755, Ebecryl 270, Ebecryl 284, Ebecryl 285, Ebecryl 4830, Ebecryl 8301, Ebecryl 8402, Ebecryl 8804, Ebecryl 220, Ebecryl 6602; Henkel Photomer 6210, Photomer 6008, Photomer 6010, Photomer 6230; DSM Desotech 3471-1-135; Loctite 3211.

MONO VINYL FUNCTIONAL REACTIVE DILUENTS

Sartomer SR 203, SR 232, SR 244, SR 256, SR 285, SR 339, SR 395, SR 440, SR 493, SR 495, SR 506; Radcure IBOA, Radcure ODA, Radcure β-CEA; Henkel Photomer 4039, Photomer 4812, Photomer 4816, Photomer 4822, Photomer 8061 and Photomer 8127; hydroxyethyl acrylate (HEA), hydroxypropyl acrylate (HPA), hydroxybutyl acrylate (HBA), hydroxyethyl methacrylate (HEMA), hydroxypropyl methacrylate (HPMA), and hydroxy-poly (alkyleneoxy) akyl acrylates and methacrylates; aromatic acrylate and methacrylate esters, such as phenyoxyethyl acrylate, poly-ethoxylated and poly-propoxylated phenoxyalkyloxy acrylates and methacrylates.

ALKOXYLATED ACRYLATE ESTER

Sartomer SR 415, SR 454, SR 492, SR 499, SR 502, SR 9035; Radcure OTA-480, Radcure TMPTEOA, Radcure Ebecryl 53; Henkel Photomer 4072, Photomer 4094, Photomer 4095, Photomer 4149, Photomer 4155, Photomer 4158, and Photomer 4355.

ACRYLATE ESTERS

Two functional acrylate polyol esters: Sartomer SR 205, SR 209, SR 210, SR 230, SR 231, SR 252, SR 259; SR 268, SR 272, SR 306, SR 344, SR 9003, SR 9209; Radcure TRPGDA, Radcure HDODA; Henkel Photomer 4050, Photomer 4065, Photomer 4061, Photomer 4126, Photomer 4127, Photomer 4160, Photomer 4193, and Photomer 4204.

Three or greater functional acrylated aliphatic polyol esters: Sartomer SR 350, SR 351, SR 444, SR 295, SR 355, SR 399, SR 9041; Radcure DPHPA, Radcure PETA K, Radcure TMPTA; Henkel Photomer 4006, Photomer 4355 and Photomer 4399.

Examples of photoinitiators which may be used to form either the dye reservoir layer 12 or the hard coating layer include, but are not limited to, Cibi-Geigy Irgacure 184, Irgacure, 651, Irgacure 500, Irgacure 907, Irgacure 369, Darocure 1173, Darocure 4265; Sartomer KIP 100F; Radcure Ebercryl P36.

Examples of surfactants which may be used to form either the dye reservoir layer 12 or the hard coating layer include, but are not limited to 3M, Co., FC-430, FC431; BykChemie BYK-370, BYK-371, BYK-345, BYK-070, and BYK-301.

Examples of anti-oxidant/stabilizers which may be used to form either the dye reservoir layer 12 or the hard coating layer include, but are not limited to, Ciba-Geigy Irganox 1010, Irganox 1076, Irganox 1035; Hindered Amine Light Stabilizers (HALS) such as Ciba-Geigy Tinuvin 292 and Tinuvin 1130; Weston Ultranox 618, Ultranox 628; phosphites such as tris(nonylphenyl) phosphite (TlPP); sulfides such as dilauryl thiodipropionate (DLTDP).

The plastic substrate used to form the tinted, scratch resistant plastic may be any clear plastic substrate. In one embodiment, the plastic substrate is an allyldiglycol carbonate (for example, CR-39, sold by PPG Industries). In another embodiment, the plastic substrate is a PC plastic. Examples of other plastic substrates which may be used include, but is not limited to PMMA modified acrylic produced by Rohm & Haas, Co. and high refractive index plastic produced by Signet Armorlite Corp.

The coatings and tinted, scratch resistant plastics of the present invention, as well as a method for preparing them, are illustrated by the following examples. Further objectives and advantages other then those set forth above will become apparent from the examples and accompanying drawings.

EXAMPLES

1. Preparation of Tinted, Scratch Resistant Plastic

The following example describes the spin coating, curing and tinting of a clear plastic. In this example, CR-39 plastic is used. However, it is noted that this example may be readily adapted for use with other plastics such as PC plastic.

According to this example, a sample of plastic having a size of about 3 inches in diameter and ⅛ inch thick was mounted on the spin table of a spin coating apparatus. While being spun at about 150 rpm, the sample was washed with isopropyl alcohol. The spin speed was then increased to about 2000–3000 rpm where it was maintained for about 30–60 seconds until the surface of the sample was dry.

After the sample surface was cleaned and dried, the spin speed was reduced to about 150 rpm. A dye reservoir layer precursor was then applied by pipette to the sample surface. The dye reservoir layer precursor was applied from the center of the sample to the edge of the sample as the sample was spun in order to form a uniform layer. Once the dye reservoir layer precursor was applied to the sample, the spin speed was increased to about 1000–6000 rpm and held for 15–90 seconds until the desired layer thickness was achieved, this thickness generally being between about 1–50 microns.

The dye reservoir layer precursor layer was then cured. Curing was performed by placing the sample in an enclosed chamber with a quartz window. Nitrogen was first purged through the chamber. The chamber continuing the sample was then passed along a conveyor belt under a Fusion Systems UV H Lamp which shined UV radiation through the quartz window onto the sample to cure the dye reservoir precursor layer. Total irradiation time for the dye reservoir precursor layer was about 1–10 seconds.

After curing the dye reservoir precursor, the sample was returned to the spin table where a hard coating precursor was applied by pipette over the cured dye reservoir layer. During application of the hard coating precursor, the sample was spun at a speed of about 150 rpm. The hard coating precursor was applied from the center of the sample to the edge of the sample as the sample was spun in order to form a uniform layer. Once the hard coating precursor had been applied to the sample, the spin speed was increased to about 1000–6000 rpm and held for 15–90 seconds until the desired layer thickness was achieved, this thickness generally being between about 1–50 microns.

The hard coating precursor layer was then cured. Curing was performed by placing the sample in an enclosed chamber with a quartz window. Nitrogen was first purged through the chamber. The chamber containing the sample was then passed along a conveyor belt under a Fusion Systems UV H Lamp which shined UV radiation through the quartz window onto the sample to cure the hard coating precursor. Total irradiation time of the hard coating precursor layer was about 1–10 seconds.

A tinting dye was then introduced through the cured hard coating layer into the cured dye reservoir layer. Tinting was performed in a stirred tinting bath charged with deionized water, 28 fl. oz., and BPI (Brain Power, Inc.) gray or black tint concentrate, 4 fl. oz., heated to a temperature of about 95° C. The sample coated with cured dye reservoir and hard coating layers was mounted in a wand bracket and immersed in the tinting bath for a period of time.

2. Method For Comparing The Degree Of Tinting Of A Sample As A Function Of Time In order to compare the degree of tinting as a function of time a series of samples are exposed to a tint bath for varying periods of time. The tint level or tintability of each sample is then measured on a McBeth TD 931 instrument and expressed as the percentage of incident light that was blocked by the tinted sample, also referred to as the "McBeth number". The McBeth number measures the light transmission of a sample. For a clear, untinted sample where the sample does not block the transmission of any light, i.e, complete light transmission, the McBeth number is zero. By contrast, a McBeth number of 100 is recorded for a totally opaque sample, i.e., when light transmission is completely prevented.

3. Method For Evaluating Scratch Resistance

The scratch resistance of the hard coating layer was evaluated by comparing the haze or light scattering of the sample before and after abrading the hard coating layer with steel wool. The % Haze Gain refers to the percentage of light transmitted (%T) after abrading the sample as measured at 550 nm using a standard UV-VIS spectrophotometer.

The following procedure was used to abrade the samples. First, a sample was mounted onto a table capable of reciprocating motion. The end of a 12.7 mm (0.5 inch) diameter dowel was covered with 0000 (quadruple aught) steel wool and secured in a vertical jig such that the end covered with steel wool rested on the test specimen and the other end was loaded with a five pound weight. The table on which the sample was mounted was then moved back and forth in a 50 mm (2 inch) long stroke for 200 complete cycles while the weighted steel wool was pressed down on the sample surface. The abraded sample was then cleaned with soap and water and then dried. The light transmission of the sample after abrasion was then measured at 550 nm. Prior to abrasion, the light transmission of each sample was also measured.

The Percent Haze Gain for each sample was calculated using the equation:

$$\% \text{ Haze Gain} = 1 - (\% \text{ Transmission}_{final} / \% \text{ Transmission}_{initial}).$$

Good scratch resistant coatings generally have a % Haze Gain of less than about 2%. By contrast, poorly scratch resistant coatings generally have a Haze Gain in excess of about 5%.

According to one embodiment of the present invention, the hard coating layer provides a % Haze Gain of less than about 2%.

4. Method For Evaluating Adhesion

The adhesion of the hard coating layer and dye reservoir layer to a plastic substrate was evaluated by a cross-hatch tape peel test. According to this test, samples were exposed for one hour to a hot tinting bath. Each sample was then scribed with a razor knife through the dye reservoir layer and the hard coating layer into the underlying plastic. A pattern of six vertical and six horizontal lines was made to give a cross-hatch with 25 individual squares. The scribed sample was then placed in a tinting bath at 95° C. for one hour, removed and rinsed with water until cool, and then dried. A piece of 3M Co. cellophane adhesive tape, #600, was then placed over the cross-hatch pattern and pulled off rapidly. The process of covering the sample with adhesive tape and rapidly removing the tape was repeated three times. If no more than a total area equal to one square was removed by the tape, the sample was deemed to have passed P) the adhesion test. By contrast, the sample was deemed to have failed (g) the adhesion test if more than one square was removed.

5. Comparison Of Tintability And Scratch Resistance As A Function Of Tint Time In this example, the tintability and scratch resistance of a series of samples was evaluated. Included in the series of samples was a lens sample of CR-39 plastic coated with a dye reservoir layer and a hard coating layer 2A as described in Example 1. The tintability and scratch resistance of this sample was compared to a sample of PC plastic coated with a commercially available tintable resin product, called Commercial Coating 2B. Also compared was a sample of CR-39 plastic coated on one side with a dye impermeable layer and a sample of untreated PC plastic 2C and a sample of untreated PC plastic 2D. All four different samples were placed in the same tint bath for 10 minutes and 15 minutes.

The resulting tinted samples were then evaluated for their degree of tinting as described in Example 2 and their scratch resistance as described in Example 3. The results of these tests are presented in Table 3a.

The results presented in Table 3a demonstrate that the tintable, scratch resistant dual coating of the present invention exhibits better scratch resistance (i.e., lower % Haze Gain) than a competitive coating product and uncoated samples of two types of plastic which are commonly used to form lens material. The results also demonstrate that the tintable, scratch resistant dual coating of the present invention has superior tintability than a competitive coating product and uncoated samples of two types of plastic, as evidenced by the greater and more rapid tinting of the coating. As shown by this example, materials coated with a dye reservoir layer and a hard coating layer according to the present invention simultaneously provide enhanced scratch resistance and tintability than the other materials tested.

TABLE 3

| Sample | Scratch Resistance % Haze Gain | Tintability McBeth Number after 10 minutes | Tintability McBeth Number at 15 minutes |
|---|---|---|---|
| 2A | 0.6% | 83 | 90 |
| 2B | 6.4% | 55 | 59 |
| 2C | 50.3% | 59 | 66 |
| 2D | >60% | 1 | 2 |

6. Performance of Different Dye Reservoir Layers

Analyzed in this example was the tintability, scratch resistance, and adhesion of samples having different dye reservoir layers on CR-39 plastic and PC plastic. The hard coating used in this example was HCL 33.

The different dye reservoir layers used in this example to coat the plastic samples are summarized in Table 3a. As illustrated in Table 3a, each dye reservoir layer includes one or more flexible oligomer components (A) and one or more reactive diluent components (RD). Each dye reservoir layer composition optionally also includes one or more acrylic ester components (AE), an alkoxylated acrylic ester components (AOA), a plasticizer component (P) and/or an urethane acrylate component (UA). The numbers specified in the table correspond to the weight percentage of the particular component.

Table 4 summarizes the results of this study. Tintability was evaluated according to method described in Example 2 and is expressed with regard to a McBeth number which is based on a 3 minute tinting in black dye tint bath at 95° C. Scratch resistance was evaluated according to method described in Example 3 and is expressed with regard to a % Haze Gain value. Adhesion was evaluated according to method described in Example 4 and is expressed as a pass or fail result. As can be seen from Table 4, each of the dye reservoir layers exhibited excellent tintability (both deep and rapid) but relatively poor scratch resistance. Each dye reservoir layer also showed passing adhesion to at least one plastic.

TABLE 3

|  | A1 | A2 | A3 | AE1 | AE2 | AOA1 | UA1 | RD1 | RD2 | RD3 | RD4 | P1 |
|---|---|---|---|---|---|---|---|---|---|---|---|---|
| DRL01 | 50 |  |  |  |  |  |  |  | 50 |  |  |  |
| DRL02 | 40 |  |  |  |  |  |  |  | 60 |  |  |  |
| DRL03 |  |  | 50 |  |  |  |  |  | 50 |  |  |  |
| DRL04 | 40 | 40 |  |  |  |  |  |  | 20 |  |  |  |
| DRL05 |  | 50 |  |  |  | 10 |  | 40 |  |  |  |  |
| DRL06 | 20 | 40 |  |  |  |  |  |  | 40 |  |  |  |
| DRL07 | 50 |  |  |  |  | 10 |  | 20 | 20 |  |  |  |
| DRL08 | 35 | 35 |  |  |  |  |  |  | 30 |  |  |  |
| DRL09 | 40 | 20 |  |  |  |  |  |  | 40 |  |  |  |
| DRL10 | 50 | 20 |  |  |  | 5 |  |  | 25 |  |  |  |
| DRL11 | 50 | 10 |  |  |  | 5 |  |  | 35 |  |  |  |
| DRL12 | 30 | 30 |  |  |  | 5 |  |  | 35 |  |  |  |
| DRL13 | 50 |  |  |  |  | 5 |  |  | 35 |  |  | 10 |
| DRL14 | 50 |  |  |  |  |  |  |  | 40 |  |  | 10 |
| DRL16 | 50 |  |  |  |  |  |  |  | 50 |  |  |  |
| DRL17 | 10 |  |  |  |  |  | 40 |  | 50 |  |  |  |
| DRL18 | 20 |  |  |  |  |  | 30 |  | 50 |  |  |  |

TABLE 3-continued

|       | A1 | A2 | A3 | AE1 | AE2 | AOA1 | UA1 | RD1 | RD2 | RD3 | RD4 | P1 |
|-------|----|----|----|-----|-----|------|-----|-----|-----|-----|-----|-----|
| DRL19 | 40 |    |    | 20  |     | 20   |     |     | 20  |     |     |    |
| DRL20 | 40 |    |    |     | 30  |      |     |     | 30  |     |     |    |
| DRL21 | 40 |    |    | 10  |     |      |     |     |     | 40  | 10  |    |

A = flexible oligomer component
A1 = Ebercryl 767 from UCB Radcure
A2 = DSM 1-135
A1 = RSX 95597 from Sartomer
AOA = alkoxylated acrylic ester component
AOA1 = SR9035 from Sartomer
UA = urethane acrylate component
UA1 = SR 966A80 from Sartomer
P# = plasticizer component
P1 = DOP
AE = acrylic ester component
AE1 = SR 344 from Sartomer
AE2 = SR CN 300 from Sartomer
RD = reactive diluent component
RD1 = SR 256 from Sartomer
RD2 = SR285 from Sartomer
RD3 = SR 495 from Sartomer
RD4 = HEMA

TABLE 4

|       | TINTABILITY (McBeth Number) | SCRATCH RESISTANCE (% Haze Gain) | ADHESION TO CR-39 PLASTIC | ADHESION TO PC PLASTIC |
|-------|------------------------------|----------------------------------|---------------------------|------------------------|
| DRL01 | 96 | >60% | P | P |
| DRL02 | 96 | >60% | P | P |
| DRL03 | 95 | >60% | P | P |
| DRL04 | 98 | >60% | P | P |
| DRL05 |    | >60% | P | P |
| DLR06 | 96 | >60% | P | P |
| DRL07 | 94 | >60% | F | P |
| DRL08 |    | >60% | P | P |
| DRL09 | 96 | >60% | P | P |
| DRL10 |    | >60% | P | P |
| DRL11 | 87 | >60% | P | P |
| DRL12 | 97 | >60% | P | P |
| DRL13 | 95 | >60% | P | P |
| DRL14 | 95 | >60% | P | P |
| DRL15 | 86 | >60% | P | P |
| DRL16 | 95 | >60% | P | P |
| DRL17 |    | >60% | F | P |
| DRL18 | 97 | >60% | P | P |
| DRL19 |    | >60% | P | P |
| DRL20 |    | >60% | P | P |
| DRL21 | 98 | >60% | P | P |

P = Pass, ≧24/25 squares adhered after test.
F = Fail, <24/25 squares adhered after test.

7. Performance of Different Hard Coating Layers

Analyzed in this example is the tintability and scratch resistance of samples having different hard coating layers. The plastic used in this example is PC plastic.

The different hard coating layers used in this example are summarized in Table 5. As illustrated in Table 5, each hard coating layer includes one or more acrylic ester components (AE) and one or more alkoxylated acrylic ester components (AOA). Each hard coating layer optionally also includes one or more adhesive promoting components (ADE) and/or one or more reactive diluent components (RD). The numbers specified in the table correspond to the weight percentage of each component in the composition.

Table 6 summarizes the results of this study. Tintability was evaluated according to method described in Example 2 and is expressed with regard to a McBeth number based on a 3 minute tinting in black dye tint bath at 95° C. Scratch resistance was evaluated according to the method described in Example 3 and is expressed with regard to a % Haze Gain. As can be seen from Table 6, the hard coating layer exhibits poorer tintability than the dye reservoir layer but exhibits outstanding scratch resistance. It has also been found that the scratch resistance provided by a hard coating layer over a dye reservoir layer is roughly equivalent to the scratch resistance provided by the hard coating layer over a plastic.

TABLE 5

| COMPOSITION | AE1 | AE2 | AOA1 | AOA2 | AOA3 | AOA4 | AOA5 | ADH1 | ADH2 | AOH3 | RD1 | RD2 |
|---|---|---|---|---|---|---|---|---|---|---|---|---|
| HLC03 | 50 | | | | | | | | | | 50 | |
| HLC04 | 40 | | 50 | | | | | 10 | | | | |
| HLC05 | | | | 100 | | | | | | | | |
| HLC06 | 27 | | | 63 | | | | 10 | | | | |
| HLC07 | 30 | | | 60 | | | | 10 | | | | |
| HLC10 | 30 | 15 | 50 | | | | | 5 | | | | |
| HLC11 | 25 | 20 | 50 | | | | | 5 | | | | |
| HLC12 | 10 | 10 | | 75 | | | | 5 | | | | |
| HLC13 | 15 | 10 | | 70 | | | | 5 | | | | |
| HLC14 | 40 | | 55 | | | | | 5 | | | | |
| HLC15 | 40 | | 55 | | | | | 5 | | | | |
| HLC16 | 39 | | 56 | | | | | 5 | | | | |
| HLC17 | 35 | 5 | 55 | | | | | 5 | | | | |
| HLC18 | 40 | | 50 | | | | | 5 | | | | 5 |
| HLC19 | 35 | | 60 | | | | | 5 | | | | |
| HLC20 | 35 | | 55 | | | | | 5 | | | 5 | |
| HLC21 | 35 | | 60 | | | | | | 5 | | | |
| HLC24 | 32 | 10 | 53 | | | | | 5 | | | | |
| HLC25 | 40 | | 50 | | | | | | | 10 | | |
| HLC26 | 35 | | 45 | | | | 15 | 5 | | | | |
| HLC27 | 33 | 6 | 55 | | | | | 6 | | | | |
| HLC28 | 40 | | 58 | | | | | 2 | | | | |
| HLC29 | 40 | | 55 | 5 | | | | | | | | |
| HLC30 | | 66 | 26 | | | | | 8 | | | | |
| HLC31 | 40 | | 57 | | | | | 3 | | | | |
| HLC32 | 14 | 37 | 46 | | | | | 3 | | | | |
| HLC33 | 39.5 | | 53.5 | 5 | | | | 2 | | | | |
| HLC34 | 22 | 21 | 55 | | | | | 2 | | | | |
| HLC35 | 40 | | 50 | 5 | | | | 5 | | | | |
| HLC36 | 42.25 | | 53.25 | | | | | 4.5 | | | | |
| HCL37 | 41 | | 54 | | | | | 5 | | | | |
| HCL38 | 41.5 | | 53.5 | | | | | 5 | | | | |
| HCL39 | 45 | | 48 | | | | | 7 | | | | |
| HCL40 | 30 | | 55 | | | | 10 | 5 | | | | |
| HCL41 | 45 | | 46.5 | 4.25 | | | | 4.25 | | | | |
| HCL42 | 42 | | 50.75 | 2.5 | | | | 4.75 | | | | |

AE# = acrylic ester component
AE1 = SR 9041 from Sartomer
AOA# = alkoxyated acrylic ester component
AOA1 = SR 9035 from Sartomer
AOA2 = SR 499 from Sartomer
AOA3 = SR 502 from Sartomer
AOA4 = SR 415 from Sartomer
AOA5 = SR 494 from Sartomer
ADH# = adhesive promoting component
ADH1 = Ebercryl 767 from UCB Radcure
ADH2 = Ebercryl 754 from UCB Radcure
ADH3 = Luctite 3211
RD# = reactive diluent component
RD1 = SR 285 from Sartomer
RD2 = Beta CEA

TABLE 6

| HARD COATING | SCRATCH RESISTANCE (% Haze Gain) | TINTABILITY (McBeth Number) |
|---|---|---|
| HCL01 | 1.1 | 10 |
| HCL02 | 0.7 | 5 |
| HCL03 | 5.0 | 2 |
| HCL04 | 2.9 | 29 |
| HCL05 | | 54 |
| HCL06 | 4.4 | 15 |
| HCL07 | 4.5 | |
| HCL08 | 4.2 | 57 |
| HCL09 | 9.0 | 57 |
| HCL10 | 3.4 | 31 |
| HCL11 | 3.3 | 36 |
| HCL12 | 4.2 | 30 |
| HCL14 | 0.7 | 20 |
| HCL15 | 0.6 | |
| HCL17 | 2.4 | 28 |
| HCL18 | 2.0 | 21 |
| HCL19 | 5.4 | 45 |
| HCL20 | 7.3 | |
| HCL21 | 5.4 | 44 |
| HCL22 | 3.2 | 36 |
| HCL23 | 2.3 | 39 |
| HCL24 | 3.3 | 43 |
| HCL26 | 2.2 | 21 |
| HCL27 | 16.2 | 39 |
| HCL28 | 0.1 | 24 |
| HCL30 | 2.7 | 14 |
| HCL31 | 36.2 | 43 |
| HCL32 | 0.2 | |
| HCL33 | 16.0 | 47 |
| HCL34 | 1.2 | |
| HCL35 | 17.2 | 47 |
| HCL36 | 0.04 | |

TABLE 6-continued

| HARD COATING | SCRATCH RESISTANCE (% Haze Gain) | TINTABILITY (McBeth Number) |
|---|---|---|
| HCL37 | 0.1 | |
| HCL38 | 0.4 | |
| HCL40 | 0.0 | |
| HCL41 | 2.0 | |
| HCL42 | 0.05 | |

8. Performance of Different Dye Reservoir Layer—Hard Coat Layer Combinations

The tintability of a series of different dye reservoir layer—hard coating layer combinations on PC plastic were compared as a function of tinting time. In this example, samples were tinted at 95° C. with either PBI, Inc., Catalytic Gray or Catalytic Black Dye. A control CR-39 blank was included in each test as an internal standard for the degree of tinting achieved. Also compared is the scratch resistance of these dye reservoir layer—hard coating layer combinations. Scratch resistance was evaluated by the abrasion method described in Example 3.

The results of this example are presented in Table 7. As can be seen from the results presented in Table 7. the reservoir dye layer—hard coating layer combinations listed exhibit superior tintability than the CR-39 plastic control while also providing superior scratch resistance.

TABLE 7

| Example No. | THC System | MB3 | MB10 | MB15 | MB20 | MB30 | MB45 | MB60 | Color/# of Sides | Scratch Resistance % Haze Gain |
|---|---|---|---|---|---|---|---|---|---|---|
| 1 | THCO1 | 50 | 81 | 89 | | 97 | 98 | 100 | GR/2 | 2.9 |
| | THCO2 | 36 | 65 | 72 | | 89 | 94 | 98 | GR/2 | 1.3 |
| | CR-39 | 29 | 54 | 61 | | 78 | 85 | 90 | GR/2 | 50 |
| 2 | THC03 | 25 | 47 | 60 | | 78 | 86 | 91 | BLK/1 | 0.7 |
| | THC04 | 32 | 58 | 70 | | 86 | 91 | 95 | BLK/1 | |
| | CR-39 | 27 | 48 | 60 | | 75 | 83 | 87 | BLK/1 | 50 |
| 3 | THC03 | 28 | 50 | 60 | | 77 | 86 | 91 | GR/1 | 0.7 |
| | CR-39 | 19 | 35 | 42 | | 56 | 65 | 72 | GR/1 | 50 |
| 4 | THC03 | | 55 | | 72 | 81 | | | BLK/1 | 0.6 |
| | THC05 | | 51 | | 67 | 76 | | | BLK/1 | 0.35 |
| | THC06 | | 48 | | 63 | 72 | | | BLK/1 | 0.22 |
| | CR-39 | | 42 | | 55 | 62 | | | BLK/1 | 50 |

MB# = McBeth Number after tinting # minutes.
GR = BPI, Inc. Catalytic Gray Dye
BLK = BPI, Inc., Catalytic Black Dye
Slides = number of slides that were tinted.
THCO1 = Dye Reservior Layer DRL 16 and Hard Coat Layer HCL 27 on PC plastic.
THCO2 = Dye Reservior Layer DRL 16 and Hard Coat Layer HCL 15 on PC plastic.
THCO3 = Dye Reservior Layer DRL 21 and Hard Coat Layer HCL 15 on PC plastic.
THCO4 = Dye Reservior Layer DRL 21 and Hard Coat Layer HCL 27 on PC plastic.
THCO5 = Dye Reservior Layer DRL 21 and Hard Coat Layer HCL 38 on PC plastic.
THCO6 = Dye Reservior Layer DRL 21 and Hard Coat Layer HCL 39 on PC plastic.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A dual layer coating for tinting a plastic material and rendering a surface of the plastic material scratch resistant, the dual coating comprising:
   (A) a dye reservoir layer formed over a surface of the material to be tinted, the dye reservoir layer including between about fifteen and eighty percent by weight of component (i) which is an acrylated oligomer or acrylated oligomer/acrylate monomer blend resin, and between about one and seventy percent by weight of component (ii) which is a mono vinyl functional reactive diluent, wherein the weight percentages of components (i) and (ii) are based upon the sum of all components in the dye reservoir layer equaling 100%; and
   (B) a coating layer formed over the dye reservoir layer, the coating layer including between about twenty and one hundred percent by weight of component (iii) which consists of alkane polyols, the alkane polyols containing up to about forty eight carbon atoms and at least three O-{acryloyl(polyalkylene oxide)} groups, each polyalkylene oxide chain including between about one and twenty alkylene oxide groups, and between about ten and seventy percent by weight of component (iv) which consists of polyacryloylated alkane polyols, the alkane polyols containing up to about twenty four carbon atoms and at least about two O-acryloyl groups, wherein the weight percentages of components (iii) and (iv) are based upon the sum of all components in the coating layer equaling 100%.

2. The dual layer coating according to claim 1 wherein the dye reservoir layer further includes between about five and thirty percent by weight of polyacryloylated alkane polyols, the alkane polyols containing up to about twenty four carbon atoms and at least about two O-acryloyl groups.

3. The dual layer coating according to claim 1 wherein the dye reservoir layer further includes between about fifteen and seventy five percent by weight of a polyacrylated urethane, the urethane having a molecular weight of less than about 3500 and at least about two acrylate groups.

4. The dual layer coating according to claim 1 wherein the dye reservoir layer further includes between about one tenth and fifteen percent by weight of a non-vinyl functional plasticizer.

5. The dual layer coating according to claim 1 wherein the dye reservoir layer includes
   between about thirty five and sixty percent by weight of an flexible acrylated oligomer or acrylated oligomer/acrylate monomer blend resin, and between about thirty and sixty percent by weight of a mono vinyl functional reactive diluent which includes O-acryloyl, and between about ten and thirty percent by weight of polyacryloylated alkane polyols, the alkane polyols containing up to about twenty four carbon atoms and at least about two O-acryloyl groups.

6. The dual layer coating according to claim 1 wherein the dye reservoir layer further includes one or more from the group consisting of surfactants, antioxidants, anti-yellowing agents and stabilizers.

7. The dual layer coating according to claim 1 wherein the hard coating layer further includes one or more from the group consisting of surfactants, anti-oxidants, anti-yellowing agents and stabilizers.

8. The dual layer coating according to claim 1 wherein the hard coating layer further includes up to about fifteen percent by weight of an adhesion promoting acrylated oligomer or acrylated oligomer/acrylate monomer blend resin.

9. The dual layer coating according to claim 8 wherein the adhesion promoting resin is selected from the group consisting of acrylated urethane, acrylated epoxy and acrylated ester oligomer resins.

10. The dual layer coating according to claim 1 wherein the hard coating layer further includes up to about sixty percent by weight of a mono vinyl functional reactive diluent.

11. The dual layer coating according to claim 1 wherein the hard coating layer further includes
between about thirty and sixty five percent by weight of alkane polyols, the alkane polyols containing up to about forty eight carbon atoms and at least about three O-[acryloyl(polyalkylene oxide)] groups and wherein the polyalkylene oxide chains include between about one and twenty alkylene oxide groups;
between about thirty five and sixty percent by weight of polyacryloylated alkane polyols, the alkane polyols containing up to about twenty four carbonatoms and at least about two O-acryloyl groups; and
between about two and ten percent by weight of an adhesion, promoting acrylated oligomer or acrylated oligomer/acrylate monomer blend resin.

12. The dual layer coating according to claim 11 wherein the adhesion promoting resin is selected from the group consisting of acrylated urethane, acrylated epoxy and acrylated ester oligomer resins.

13. The dual layer coating according to claim 1 wherein the dual layer coating has a Haze Gain of less than about 2%.

14. The dual layer coating according to claim 1 wherein dye reservoir layer further includes a dye.

15. The dual layer coating according to claim 14 wherein the dual layer coating has a McBeth number of at least about 5.

16. The dual layer coating according to claim 15 wherein the dual layer coating has a Haze Gain of less than about 2%.

17. A tintable, scratch resistant plastic comprising:
(A) a clear plastic having a first surface;
(B) a dye reservoir layer formed over the first surface, the dye reservoir layer including between about fifteen and eighty percent by weight of component (i) which is an acrylated oligomer or acrylated oligomer/acrylate monomer blend resin, and between about one and seventy percent by weight of component (ii) which is a mono vinyl functional reactive diluent, wherein the weight percentages of components (i) and (ii) are based upon the sum of all components in the dye reservoir layer equaling 100%; and
(C) a coating layer formed over the dye reservoir layer, the coating layer including between about twenty and one hundred percent by weight of component (iii) which consists of alkane polyols, the alkane polyols containing up to about forty eight carbon atoms and at least three O-{acryloyl(polyalkylene oxide)} groups, each polyalkylene oxide chain including between about one and twenty alkylene oxide groups, and between about ten and seventy percent by weight of component (iv) which consists of polyacryloylated alkane polyols, the alkane polyols containing up to about twenty four carbon atoms and at least about two O-acryloyl groups, wherein the weight percentages of components (iii) and (iv) are based upon the sum of all components in the coating layer equaling 100%.

18. The tintable scratch resistant plastic according, to claim 17 wherein the dye reservoir layer further includes between about five and thirty percent by weight of poly-acryloylated alkane polyols, the alkane polyols containing up to about twenty four carbon atoms and at least about two O-acryloyl groups.

19. The tintable, scratch resistant plastic according to claim 17 wherein the dye reservoir layer further includes between about fifteen and seventy five percent by weight of a polyacrylated urethane, the urethane having a molecular weight of less than about 3500 and at least about two acrylate groups.

20. The tintable, scratch resistant plastic according to claim 17 wherein the dye reservoir layer further includes between about one tenth and fifteen percent by weight of a non-vinyl functional plasticizer.

21. The tintable, scratch resistant plastic according to claim 17 wherein the dye reservoir layer includes
between about thirty five and sixty percent by weight of a flexible acrylated oligomer or acrylated oligomer/acrylate monomer blend resin, between about thirty and sixty percent by weight of a mono vinyl functional reactive diluent which includes O-acryloyl, and
between about ten and thirty percent by weight of poly-acryloylated alkane polyols, the alkane polyols containing up to about twenty four carbon atoms and at least about two O-acryloyl groups.

22. The tintable, scratch resistant plastic according to claim 17 wherein the hard coating layer further includes up to about fifteen percent by weight of an adhesion promoting acrylated oligomer or acrylated oligomer/acrylate monomer blend resin.

23. The tintable, scratch resistant plastic according to claim 22 wherein the adhesion promoting resin is selected from the group consisting of acrylated urethane, acrylated epoxy and acrylated ester oligomer resins.

24. The tintable, scratch resistant plastic according to claim 17 wherein the hard coating layer further includes up to about sixty percent by weight of a mono vinyl functional reactive diluent.

25. The tintable, scratch resistant plastic according to claim 17 wherein the hard coating layer further includes
between about thirty and sixty five percent by weight of alkane polyols, the alkane polyols containing up to about forty eight carbon atoms and at least about three O-[acryloyl(polyalkylene oxide)] groups and wherein the polyalkylene oxide chains include between about one and twenty alkylene oxide groups;
between about thirty five and sixty percent by weight of polyacryloylated alkane polyols, the alkane polyols containing up to about twenty four carbon atoms and at least about two O-acryloyl groups; and
between about two to ten percent by weight of an adhesion promoting acrylated oligomer or acrylated oligomer/acrylate monomer blend resin.

26. The tintable, scratch resistant plastic according to claim 25 wherein the adhesion promoting resin is selected from the group consisting of acrylated urethane, acrylated epoxy and acrylated ester oligomer resins.

27. The tintable, scratch resistant plastic according to claim 17 wherein the dye reservoir layer further includes a dye.

28. The tintable, scratch resistant plastic according to claim 27 wherein the dual layer coating has a McBeth number of at least about 10.

29. The tintable, scratch resistant plastic according to claim 28 wherein the dual layer coating has a Haze Gain of less than about 2%.

30. A tintable, scratch resistant plastic comprising:
(A) a clear plastic having a first surface and a second surface;
(B) a dye reservoir layer formed over the first surface, the dye reservoir layer including between about fifteen and eighty percent by weight of component (i) which is an acrylated oligomer or acrylated oligomer/acrylate monomer blend resin, and between about one and seventy percent by weight of component (ii) which is a mono vinyl functional reactive diluent, wherein the weight percentages of components (i) and (ii) are based upon the sum of all components in the dye reservoir layer equaling 100%;
(C) a first coating layer formed over the dye reservoir layer; and
(D) a second coating layer formed over the second plastic surface, the first and second coating layers independently including between about twenty and one hundred percent by weight of component (iii) which consists of alkane polyols, the alkane polyols containing up to about forty eight carbon atoms and at least three O-{acryloyl(polyalkylene oxide)} groups, each polyalkylene oxide chain including between about one and twenty alkylene oxide groups, and between about ten and seventy percent by weight of component (iv) which consists of polyacryloylated alkane polyols, the alkane polyols containing up to about twenty four carbon atoms and at least about two O-acryloyl groups, wherein the weight percentages of components (iii) and (iv) are based upon the sum of all components in the coating layer equaling 100%.

31. The tintable, scratch resistant plastic according to claim 30 wherein the dye reservoir layer further includes between about five and thirty percent by weight of polyacryloylated alkane polyols, the alkane polyols containing up to about twenty four carbon atoms and at least two O-acryloyl groups.

32. The tintable, scratch resistant plastic according, to claim 30 wherein the dye reservoir layer further includes between about fifteen and seventy five percent by weight of a polyacrylated urethane, the urethane having a molecular weight of less than about 3500 and at least about two acrylate groups.

33. The tintable, scratch resistant plastic according to claim 30 wherein the dye reservoir layer further includes between about one tenth and fifteen percent by weight of a non-vinyl functional plasticizer.

34. The tintable, scratch resistant plastic according to claim 30 wherein the dye reservoir layer includes
between about thirty five and sixty percent by weight of a flexible acrylated oligomer or acrylated oligomer/acrylate monomer blend resin,
between about thirty and sixty percent by weight of a mono vinyl functional reactive diluent which includes O-acryloyl, and
between about ten and thirty percent by weight of polyacryloylated alkane polyols, the alkane polyols containing up to about twenty four carbon atoms and at least about two O-acryloyl groups.

35. The tintable, scratch resistant plastic according to claim 30 wherein the hard coating layer further includes up to about fifteen percent by weight of an adhesion promoting acrylated oligomer or acrylated oligomer/acrylate monomer blend resin.

36. The tintable, scratch resistant plastic according to claim 35 wherein the adhesion promoting resin is selected from the group consisting of acrylated urethane, acrylated epoxy and acrylated ester oligomer resins.

37. The tintable, scratch resistant plastic according to claim 30 wherein the hard coating layer further includes up to about sixty percent by weight of a mono vinyl functional reactive diluent.

38. The tintable, scratch resistant plastic according to claim 30 wherein the hard coating layer further includes
between about thirty and sixty five percent by weight of alkane polyols, the alkane polyols containing up to about forty eight carbon atoms and at least about three O-[acryloyl(polyalkylene oxide] groups and wherein the polyalkylene oxide chains include between about one and twenty alkylene oxide groups;
between about thirty five and sixty percent by weight of polyacryloylated alkane polyols, the alkane polyols containing up to about twenty four carbon atoms and at least about two O-acryloyl groups; and
between about two to ten percent by weight of an adhesion promoting acrylated oligomer or acrylated oligomer/acrylate monomer blend resin.

39. The tintable, scratch resistant plastic according to claim 38 wherein the adhesion promoting resin is selected from the group consisting of acrylated urethane, acrylated epoxy and acrylated ester oligomer resins.

40. The tintable, scratch resistant plastic according to claim 30 wherein the dye reservoir layer further includes a dye.

41. The tintable, scratch resistant plastic according to claim 40 wherein the dual layer coating has a McBeth number of at least about 20.

42. The tintable, scratch resistant plastic according to claim 40 wherein the dual layer coating has a Haze Gain of less than about 2%.

43. A tintable, scratch resistant plastic comprising:
(A) a clear plastic having a first surface and a second surface;
(B) a first dye reservoir layer formed over the first surface;
(C) a first coating layer formed over the first dye reservoir layer;
(D) a second dye reservoir layer formed over the second surface; and
(E) a second coating layer formed over the second dye reservoir layer;
the first and second dye reservoir layers independently including between about fifteen and eighty percent by weight of component (i) which is an acrylated oligomer or acrylated oligomer/acrylate monomer blend resin, and between about one and seventy percent by weight of component (ii) which is a mono vinyl functional reactive diluent, wherein the weight percentages of components (i) and (ii) are based upon the sum of all components in the dye reservoir layer equaling 100%; and the first and second coating layers independently including between about twenty and one hundred percent by weight of component (iii) which consists of alkane polyols, the alkane polyols containing up to about forty eight carbon atoms and at least three O-{acryloyl(polyalkylene oxide)} groups, each polyalkylene oxide chain including between about one and twenty alkylene oxide groups, and between about ten and seventy percent by weight of component (iv) which consists of polyacryloylated alkane polyols, the alkane polyols containing up to about twenty four carbon atoms and at least about two O-acryloyl groups, wherein the weight percentages of components (iii) and (iv) are based upon the sum of all components in the coating layer equaling 100%.

44. The tintable, scratch resistant plastic according to claim 43 wherein the dye reservoir layer further includes between about five and thirty percent by weight of polyacryloylated alkane polyols, the alkane polyols containing up to about twenty four carbon atoms and at least about two O-acryloyl groups.

45. The tintable, scratch resistant plastic according to claim 43 wherein the dye reservoir layer further includes between about fifteen and seventy five percent by weight of a polyacrylated urethane, the urethane having a molecular weight of less than about 3500 and at least about two acrylate groups.

46. The tintable, scratch resistant plastic according to claim 43 wherein the dye reservoir layer further includes between about one tenth and fifteen percent by weight of a non-vinyl functional plasticizer.

47. The tintable, scratch resistant plastic according to claim 43 wherein the dye reservoir layer includes between about thirty five and sixty percent by weight of a flexible acrylated oligomer or acrylated oligomer/acrylate monomer blend resin, between about thirty and sixty percent by weight of a mono vinyl functional reactive diluent which includes O-acryloyl, and between about ten and thirty percent by weight of polyacryloylated alkane polyols, the alkane polyols containing up to about twenty four carbon atoms and at least about two O-acryloyl groups.

48. The tintable, scratch resistant plastic according to claim 43 wherein the hard coating layer further includes up to about fifteen percent by weight of an adhesion promoting acrylated oligomer or acrylated oligomer/acrylate monomer blend resin.

49. The tintable, scratch resistant plastic according to claim 48 wherein the adhesion promoting resin is selected from the group consisting of acrylated urethane, acrylated epoxy and acrylated ester oligomer resins.

50. The tintable, scratch resistant plastic according to claim 43 wherein the hard coating layer further includes up to about sixty percent by weight of a mono vinyl functional reactive diluent.

51. The tintable, scratch resistant plastic according to claim 43 wherein the hard coating layer further includes between about thirty and sixty five percent by weight of alkane polyols, the alkane polyols containing up to about forty eight carbon atoms and at least about three O-[acryloyl(polyalkylene oxide)] groups and wherein the polyalkylene oxide chains include between about one and twenty alkylene oxide groups;

between about thirty five and sixty percent by weight of polyacryloylated alkane polyols, the alkane polyols containing up to about twenty four carbon atoms and at least about two O-acryloyl groups; and between about two to ten percent by weight of an adhesion promoting acrylated oligomer or acrylated oligomer/acrylate monomer blend resin.

52. The tintable, scratch resistant plastic according to claim 51 wherein the adhesion promoting resin is selected from the group consisting of acrylated urethane, acrylated epoxy and acrylated ester oligomer resins.

53. The tintable, scratch resistant plastic according to claim 43 wherein the dye reservoir layer further includes a dye.

54. The tintable, scratch resistant plastic according to claim 53 wherein the dual layer coating has a McBeth number of at least about 25.

55. The tintable, scratch resistant plastic according to claim 53 wherein the dual layer coating has a Haze Gain of less than about 2%.

* * * * *